United States Patent
Ke

(10) Patent No.: US 11,254,324 B2
(45) Date of Patent: Feb. 22, 2022

(54) VEHICLE AND VEHICLE CONTROLLING METHOD

(71) Applicant: Acer Incorporated, New Taipei (TW)

(72) Inventor: Liang-Yu Ke, New Taipei (TW)

(73) Assignee: Acer Incorporated, New Taipei (TW)

( * ) Notice: Subject to any disclaimer, the term of this patent is extended or adjusted under 35 U.S.C. 154(b) by 70 days.

(21) Appl. No.: 16/565,495

(22) Filed: Sep. 10, 2019

(65) Prior Publication Data

US 2021/0009144 A1 Jan. 14, 2021

(30) Foreign Application Priority Data

Jul. 8, 2019 (TW) .................................. 108123960

(51) Int. Cl.
*B60W 50/029* (2012.01)
*B60W 30/095* (2012.01)

(52) U.S. Cl.
CPC ........ *B60W 50/029* (2013.01); *B60W 30/095* (2013.01); *B60W 2556/50* (2020.02); *B60W 2710/20* (2013.01); *B60W 2720/106* (2013.01)

(58) Field of Classification Search
CPC ............ B60W 50/029; B60W 30/095; B60W 2556/50; B60W 2710/20; B60W 2720/106
See application file for complete search history.

(56) References Cited

U.S. PATENT DOCUMENTS

| 2002/0099481 | A1* | 7/2002 | Mori | G05D 1/027 |
| | | | | 701/23 |
| 2018/0348771 | A1* | 12/2018 | Chu | B60W 30/0956 |
| 2020/0211394 | A1* | 7/2020 | King | G05D 1/0289 |

FOREIGN PATENT DOCUMENTS

| CN | 104937512 | | 9/2015 | |
| CN | 105358396 | | 2/2016 | |
| CN | 106564505 | | 4/2017 | |
| CN | 106842245 | | 6/2017 | |
| CN | 206691107 | | 12/2017 | |
| CN | 108475055 | | 8/2018 | |
| CN | 108688662 | | 10/2018 | |
| CN | 108845343 | | 11/2018 | |
| CN | 109116397 | | 1/2019 | |
| CN | 109885608 | A * | 6/2019 | ............ G06F 16/25 |
| DE | 102015003124 | | 9/2016 | |

(Continued)

OTHER PUBLICATIONS

Machine translation of CN-109885608-A (Year: 2019).*

*Primary Examiner* — Jeff A Burke
*Assistant Examiner* — Mohamad O El Sayah
(74) *Attorney, Agent, or Firm* — JCIPRNET

(57) ABSTRACT

A vehicle and a vehicle controlling method are provided. The vehicle includes a computing system; a vehicle controlling module coupled to the computing system; and a positioning module coupled to the computing system and the vehicle controlling module. The vehicle controlling module receives a safe stop path and a fusion coordinate from the computing system. When the vehicle controlling module determines that an abnormality occurs in the computing system, the vehicle controlling module receives a positioning coordinate from the positioning module and calculates an offset corresponding to the positioning coordinate and the fusion coordinate. The vehicle controlling module transmits a vehicle controlling command to the vehicle according to the offset and the safe stop path.

12 Claims, 4 Drawing Sheets

(56) References Cited

FOREIGN PATENT DOCUMENTS

| | | |
|---|---|---|
| JP | S5940112 | 3/1984 |
| TW | 201126137 | 8/2011 |
| TW | 201908696 | 3/2019 |
| TW | 201924992 | 7/2019 |

\* cited by examiner

VEHICLE AND VEHICLE CONTROLLING METHOD

CROSS-REFERENCE TO RELATED APPLICATION

This application claims the priority benefit of Taiwan application serial no. 108123960, filed on Jul. 8, 2019. The entirety of the above-mentioned patent application is hereby incorporated by reference herein and made a part of this specification.

BACKGROUND

Technical Field

The disclosure relates to a vehicle and a vehicle controlling method, and more particularly to a vehicle and a vehicle controlling method allowing the vehicle to be safely stopped when the vehicle system is abnormal.

Description of Related Art

At present, most self-driving cars brake immediately when the system fails. However, if only the brake is controlled and the control of the steering wheel is neglected, serious safety issues will arise. For example, when the vehicle is on a curved road, if an effective control to the lateral motion of the vehicle is not continuously maintained before the vehicle is completely braked to stop, the vehicle may skid to another lane and cause a traffic accident. Therefore, how to safely stop the vehicle when the vehicle system is abnormal should be a goal for persons skilled in the art to strive for.

SUMMARY

The disclosure provides a vehicle and a vehicle controlling method allowing the vehicle to be safely stopped when the vehicle system is abnormal.

The disclosure provides a vehicle including a computing system, a vehicle controlling module coupled to the computing system, and a positioning module coupled to the computing system and the vehicle controlling module. The vehicle controlling module receives a safe stop path and a fusion coordinate from the computing system. When the vehicle controlling module determines that an abnormality occurs in the computing system, the vehicle controlling module receives a positioning coordinate from the positioning module and calculates an offset corresponding to the positioning coordinate and the fusion coordinate. The vehicle controlling module transmits a vehicle controlling command to the vehicle according to the offset and the safe stop path.

The disclosure provides a vehicle controlling method for a vehicle. The vehicle includes a computing system, a vehicle controlling module coupled to the computing system, and a positioning module coupled to the computing system and the vehicle controlling module. The vehicle controlling method includes the following steps. A safe stop path and a fusion coordinate are received by the vehicle controlling module from the computing system. A positioning coordinate is received by the vehicle controlling module from the positioning module when the vehicle controlling module determines that an abnormality occurs in the computing system, and an offset corresponding to the positioning coordinate and the fusion coordinate is calculated. A vehicle controlling command is transmitted by the vehicle controlling module to the vehicle according to the offset and the safe stop path.

Based on the above, the vehicle controlling module of the vehicle and the vehicle controlling method according to the disclosure receives the safe stop path and the fusion coordinate when the computing system is in normal operation, and directly receives the positioning coordinate from the positioning module and calculates the offset corresponding to the positioning coordinate and the fusion coordinate when an abnormality occurs in the computing system. The vehicle controlling module then transmits the vehicle controlling command to the vehicle according to the offset and the safe stop path to safely stop the vehicle.

To make the aforementioned and other features of the disclosure more comprehensible, several embodiments accompanied with drawings are described in detail as follows.

DETAILED DESCRIPTION OF DISCLOSED EMBODIMENTS

Figure 1:
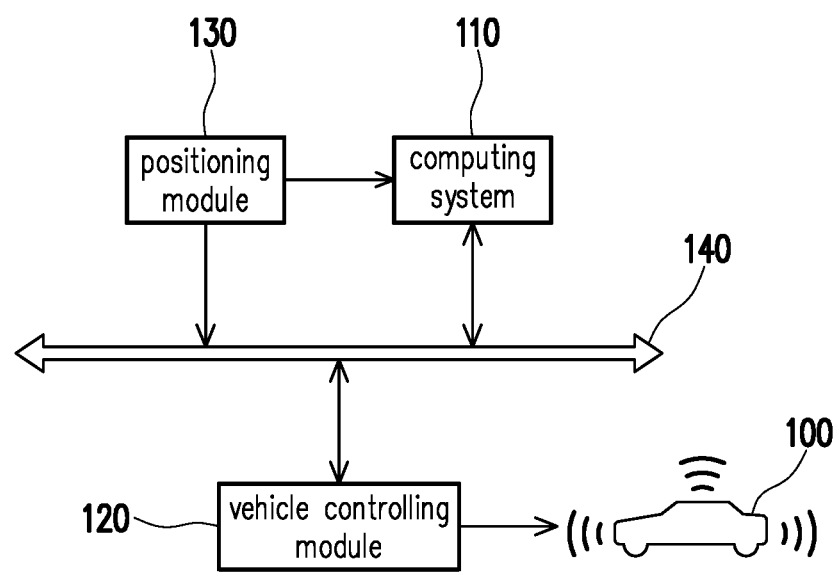
FIG. 1 is a block diagram of a vehicle according to an embodiment of the disclosure.

FIG. 1 is a block diagram of a vehicle according to an embodiment of the disclosure.

Referring to FIG. 1, a vehicle 100 according to an embodiment of the disclosure includes a computing system 110, a vehicle controlling module 120, and a positioning module 130. The vehicle controlling module 120 is coupled to the computing system 110. The positioning module 130 is coupled to the computing system 110 and the vehicle controlling module 120. The computing system 110 and the positioning module 130 may communicate with the vehicle controlling module 120 through a bus 140. The computing system 110 is, for example, a Linux desktop computer system or other hardware and/or software systems having a relatively large computing power for executing functions such as route planning. The vehicle controlling module 120 is, for example, an automotive safety integrity level D (ASIL D) hardware and/or software, or other similar elements. The positioning module 130 may include elements such as a global positioning system (GPS), a real-time kinematic (RTK) sensor, an inertial measurement unit (IMU) sensor, etc., and may output a positioning coordinate. The bus 140 is, for example, a controller area network (CAN) bus or other similar elements. The computing power of the computing system 110 is greater than the computing power of the vehicle controlling module 120. However, the reliability of the vehicle controlling module 120 is greater than the reliability of the computing system 110.

Figure 2:
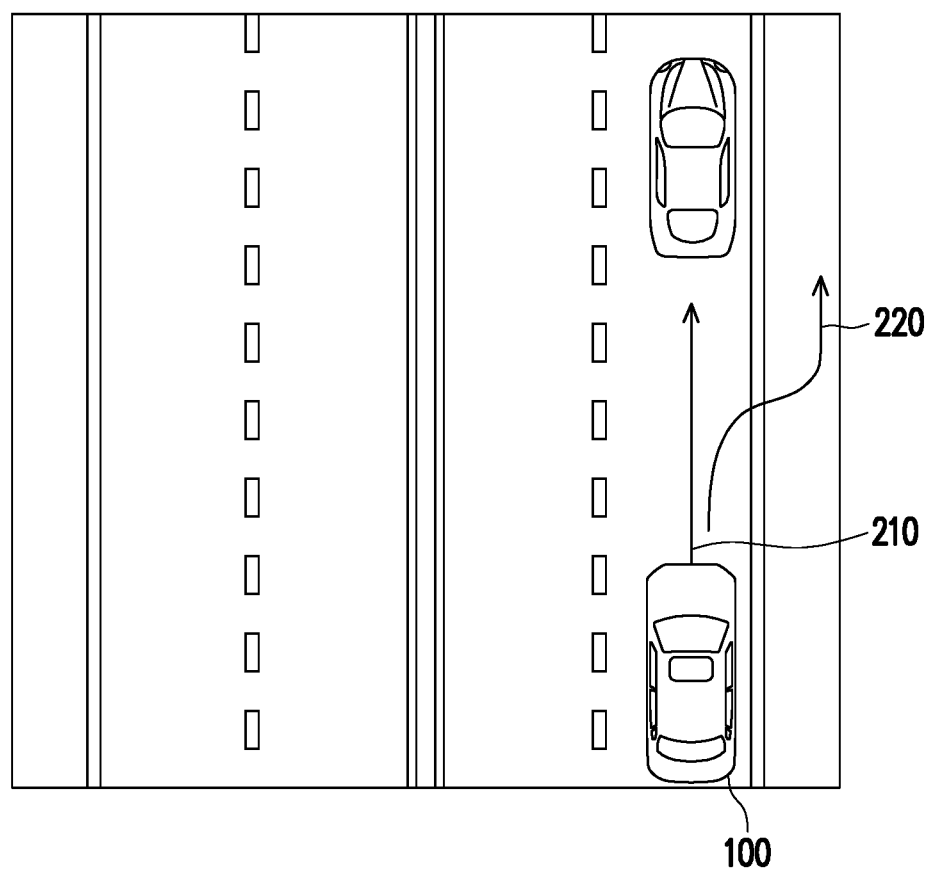
FIG. 2 is a schematic diagram of a safe stop path according to an embodiment of the disclosure.
Figure 3:
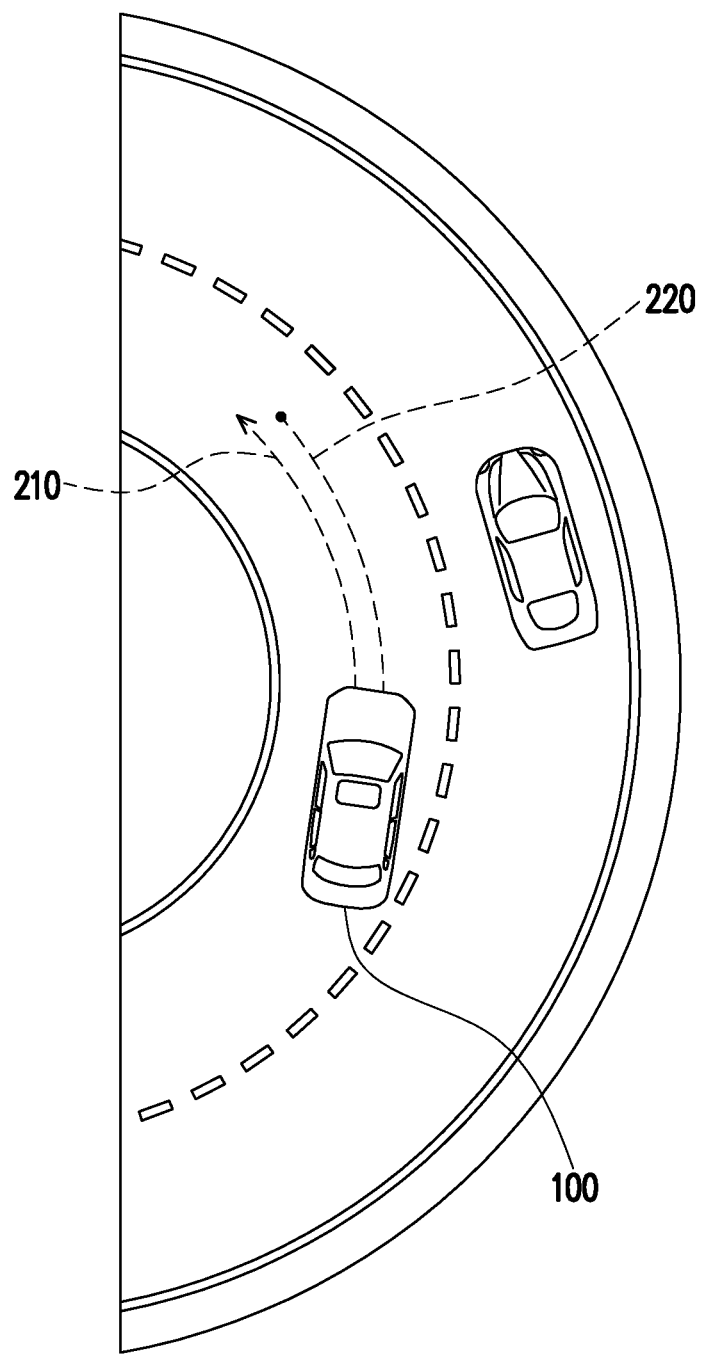
FIG. 3 is a schematic diagram of a safe stop path according to another embodiment of the disclosure.

When the vehicle 100 is travelling normally, the computing system 110 simultaneously transmits a normal travel path and a safe stop path to the vehicle controlling module 120 to control the movement of the vehicle 100. The normal travel path and the safe stop path each include a plurality of coordinate points and a target speed and/or a target acceleration and/or a target deceleration, and a target vehicle speed corresponding to each of the coordinate points. The vehicle controlling module 120 controls the movement of the vehicle 100 according to the normal travel path when the computing system 110 is detected as normal. The vehicle controlling module 120 controls the movement of the vehicle 100 according to the safe stop path when the computing system 110 is detected as abnormal. An abnormality of the computing system 110 is, for example, an abnormal situation such as a system dead time, a message timeout, an excessive delay, a transmission of duplicate data, etc. Taking FIG. 2 as an example, the vehicle 100 travels in a lane along a normal travel path 210 when the computing system 110 is normal, and the vehicle 100 will travel along a safe stop path 220 to an outer lane and brake to stop when the computing system 110 is abnormal. Taking FIG. 3 as an example, the vehicle 100 travels on a curve road along the normal travel path 210 when the computing system 110 is normal, and when the computing system 110 is abnormal, since there are other vehicles outside the curved road, the vehicle 100 will brake to stop along the safe stop path 220 in the original lane.

Since the positioning coordinate (for example, GPS coordinate points) outputted by the positioning module 130 may have an error (for example, an error of a few meters), the computing system 110 may obtain a more accurate vehicle coordinate (or fusion coordinate) through a localization fusion module in the computing system 110 according to driving data such as the positioning coordinate, a driving image, etc. after receiving the positioning coordinate outputted by the positioning module 130, and use the fusion coordinate to plan the driving route.

In an embodiment, the vehicle controlling module 120 receives the safe stop path and the fusion coordinate from the computing system 110. When the vehicle controlling module 120 determines that an abnormality occurs in the computing system 110, the vehicle controlling module 120 receives the positioning coordinate from the positioning module 130 and calculates an offset corresponding to the positioning coordinate and the fusion coordinate. The vehicle controlling module 120 transmits a vehicle controlling command to the vehicle 100 according to the offset and the safe stop path. The vehicle controlling command may include a steering wheel rotation command, an accelerator command, a brake command, etc.

Specifically, the offset may represent an error of the last fusion coordinate data and the positioning coordinate received from the positioning module 130 at the same time received by the vehicle controlling module 120 before the operation system 110 is abnormal. In the event that the computing system 110 is abnormal and the localization fusion module is also faulty, the vehicle controlling module 120 may still correct the positioning coordinates successively received from the positioning module 130 through the offset, and control the vehicle 100 to be safely stopped according to the corrected positioning coordinate and the safe stop path.

From the occurrence of an abnormality in the computing system 110 to before the vehicle 100 is safely stopped, a longitudinal control (i.e. speed control) and a lateral control (i.e. steering wheel control) of the vehicle 100 by the vehicle controlling module 120 are included.

In an embodiment, the vehicle controlling module 120 calculates the corrected coordinate according to the positioning coordinate and the offset to obtain the target deceleration and the target vehicle speed of the coordinate point closest to the corrected coordinate in the coordinate points of the safe stop path, and transmits the vehicle controlling command to the vehicle 100 according to the target deceleration and the target vehicle speed. As such, the vehicle 100 may be braked to stop according to the previously planned deceleration.

In an embodiment, the vehicle controlling module 120 determines a lateral distance error according to the positioning coordinate, the offset, and the safe stop path, and transmits a steering wheel angle command to the vehicle 100 according to the lateral distance error and the plurality of positioning coordinates. Specifically, the vehicle controlling module 120 may determine the lateral distance error according to the corrected coordinate and the safe stop path, and obtain a vehicle heading from the continuous positioning coordinate data. Therefore, the vehicle controlling module 120 may calculate the steering wheel angle command according to the lateral distance error and the vehicle heading, so that the vehicle 100 may be maintained on the safe stop path without offsetting.

Figure 4:
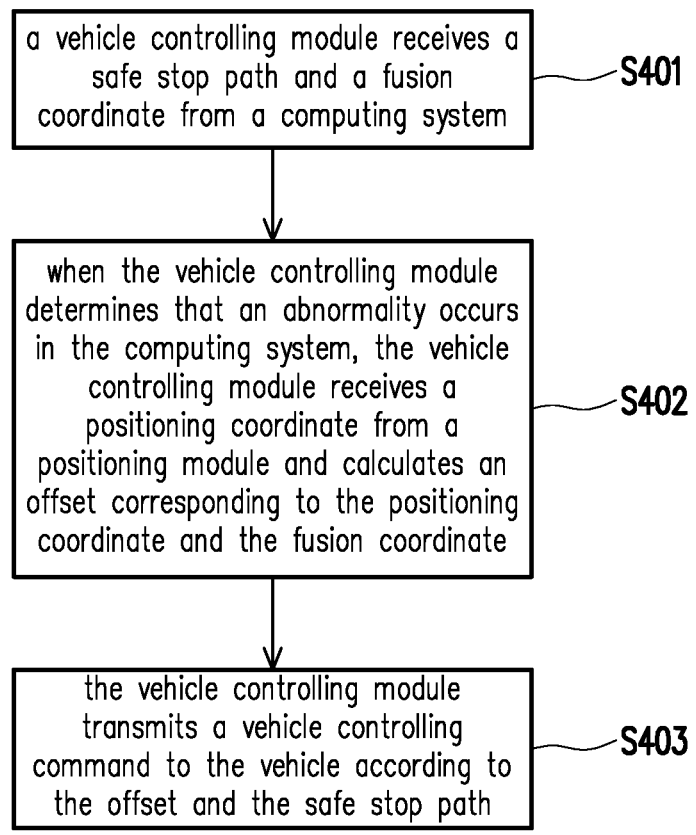
FIG. 4 is a flow chart of a vehicle controlling method according to an embodiment of the disclosure.

FIG. 4 is a flow chart of a vehicle controlling method according to an embodiment of the disclosure.

Referring to FIG. 4, in Step S401, a vehicle controlling module receives a safe stop path and a fusion coordinate from a computing system.

In Step S402, when the vehicle controlling module determines that an abnormality occurs in the computing system, the vehicle controlling module receives a positioning coordinate from a positioning module and calculates an offset corresponding to the positioning coordinate and the fusion coordinate.

In Step S403, the vehicle controlling module transmits a vehicle controlling command to the vehicle according to the offset and the safe stop path.

Based on the above, the vehicle controlling module of the vehicle and the vehicle controlling method according to the disclosure receives the safe stop path and the fusion coordinate when the computing system is in normal operation, and directly receives the positioning coordinate from the positioning module and calculates the offset corresponding to the positioning coordinate and the fusion coordinate when an abnormality occurs in the computing system. The vehicle controlling module then transmits the vehicle controlling command to the vehicle according to the offset and the safe stop path to safely stop the vehicle.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vehicle, comprising:
   a computing system;
   a vehicle controlling module coupled to the computing system; and
   a positioning module coupled to the computing system and the vehicle controlling module, wherein
   the vehicle controlling module receives a safe stop path and a fusion coordinate from the computing system when the computing system is in normal operation,
   when the vehicle controlling module determines that an abnormality occurs in the computing system, the vehicle controlling module is configured to:
   take out a last fusion coordinate received at a time point before the abnormality occurs in the computing system and a last positioning coordinate received at the same time point from the positioning module, calculate an offset based on the last fusion coordinate and the last positioning coordinate, which are received before the abnormality occurs in the computing system, correct a positioning coordinate received after the abnormality occurs in the computing system through the offset to obtain a corrected coordinate, and transmit a vehicle controlling command to the vehicle according to the corrected coordinate and the safe stop path.

2. The vehicle according to claim 1, wherein the computing system obtains the fusion coordinate at least according to a global positioning system coordinate and an image.

3. The vehicle according to claim 1, wherein the safe stop path comprises a plurality of coordinate points, and a target deceleration and a target vehicle speed corresponding to each of the plurality of coordinate points.

4. The vehicle according to claim 3, wherein the vehicle controlling module calculates the corrected coordinate according to the positioning coordinate received after the abnormality occurs in the computing system and the offset, obtains the target deceleration and the target vehicle speed of the coordinate point closest to the corrected coordinate in the plurality of coordinate points, and transmits the vehicle controlling command to the vehicle according to the target deceleration and the target vehicle speed.

5. The vehicle according to claim 1, wherein the vehicle controlling module determines a lateral distance error according to the positioning coordinate received after the abnormality occurs in the computing system, the offset, and the safe stop path, and transmits a steering wheel angle command to the vehicle according to the lateral distance error and a plurality of the positioning coordinates.

6. The vehicle according to claim 1, wherein a computing power of the computing system is greater than a computing power of the vehicle controlling module.

7. A vehicle controlling method for a vehicle, the vehicle comprises a computing system, a vehicle controlling module coupled to the computing system, and a positioning module coupled to the computing system and the vehicle controlling module, the vehicle controlling method comprising:

receiving a safe stop path and a fusion coordinate by the vehicle controlling module from the computing system when the computing system is in normal operation;

when the vehicle controlling module determines that the computing system is abnormal, executing followings by the vehicle controlling module, comprising:

taking out a last fusion coordinate received at a time point before an abnormality occurs in the computing system and a last positioning coordinate received at the same time point from the positioning module;

calculating an offset based on the last fusion coordinate and the last positioning coordinate, which are received before the abnormality occurs in the computing system;

correcting a positioning coordinate received after the abnormality occurs in the computing system through the offset to obtain a corrected coordinate; and transmitting a vehicle controlling command to the vehicle according to the corrected coordinate and the safe stop path.

8. The vehicle controlling method according to claim 7, wherein the computing system obtains the fusion coordinate at least according to a global positioning system coordinate and an image.

9. The vehicle controlling method according to claim 7, wherein the safe stop path comprises a plurality of coordinate points, and a target deceleration and a target vehicle speed corresponding to each of the plurality of coordinate points.

10. The vehicle controlling method according to claim 9, wherein the vehicle controlling module calculates the corrected coordinate according to the positioning coordinate received after the abnormality occurs in the computing system and the offset, obtains the target deceleration and the target vehicle speed of the coordinate point closest to the corrected coordinate in the plurality of coordinate points, and transmits the vehicle controlling command to the vehicle according to the target deceleration and the target vehicle speed.

11. The vehicle controlling method according to claim 7, wherein the vehicle controlling module determines a lateral distance error according to the positioning coordinate received after the abnormality occurs in the computing system, the offset, and the safe stop path, and transmits a steering wheel angle command to the vehicle according to the lateral distance error and a plurality of the positioning coordinates.

12. The vehicle controlling method according to claim 7, wherein a computing power of the computing system is greater than a computing power of the vehicle controlling module.

* * * * *